United States Patent
Bordeleau et al.

(10) Patent No.: US 7,372,472 B1
(45) Date of Patent: May 13, 2008

(54) METHOD AND APPARATUS FOR GRAPHICALLY DEFINING A VIDEO PARTICLE EXPLOSION EFFECT

(75) Inventors: David Bordeleau, Montreal (CA); André Laframboise, Notre Dame de l'Ile Perrot (CA); Michel St-Pierre, Laval (CA)

(73) Assignee: Matrox Electronic Systems Ltd., Dorval, QC (CA)

( * ) Notice: Subject to any disclaimer, the term of this patent is extended or adjusted under 35 U.S.C. 154(b) by 411 days.

(21) Appl. No.: 09/828,457

(22) Filed: Apr. 9, 2001

(51) Int. Cl.
*G06G 5/00* (2006.01)
*G06T 13/00* (2006.01)

(52) U.S. Cl. ...................... 345/619; 345/473
(58) Field of Classification Search ............. 345/619, 345/581, 646–649, 600, 473, 474, 475; 715/863
See application file for complete search history.

(56) References Cited

U.S. PATENT DOCUMENTS

| | | | | |
|---|---|---|---|---|
| 5,225,824 A * | 7/1993 | Yamamoto et al. | ......... | 345/574 |
| 5,500,925 A * | 3/1996 | Tolson | ......... | 345/581 |
| 5,561,745 A * | 10/1996 | Jackson et al. | ......... | 345/419 |
| 5,602,570 A * | 2/1997 | Capps et al. | ......... | 345/173 |
| 5,936,639 A * | 8/1999 | Andalman et al. | ......... | 345/474 |
| 5,966,134 A * | 10/1999 | Arias | ......... | 345/589 |
| 6,069,668 A * | 5/2000 | Woodham et al. | ......... | 345/578 |
| 6,084,588 A * | 7/2000 | De Haan | ......... | 345/419 |
| 6,278,455 B1 * | 8/2001 | Baker | ......... | 345/716 |
| 6,416,204 B1 * | 7/2002 | Cutshaw | ......... | 362/326 |
| 6,456,289 B1 * | 9/2002 | O'Brien et al. | ......... | 345/473 |
| 6,500,008 B1 * | 12/2002 | Ebersole et al. | ......... | 434/226 |
| 6,514,142 B1 * | 2/2003 | Hattori et al. | ......... | 463/31 |
| 6,570,569 B1 * | 5/2003 | Tsukamoto et al. | ......... | 345/473 |
| 6,664,965 B1 * | 12/2003 | Yamamoto et al. | ......... | 345/473 |
| 6,686,919 B1 * | 2/2004 | Kanetaka et al. | ......... | 345/473 |
| 6,690,810 B2 * | 2/2004 | Ito | ......... | 382/100 |
| 6,714,202 B2 * | 3/2004 | Dorrell | ......... | 345/474 |
| 6,888,549 B2 * | 5/2005 | Bregler et al. | ......... | 345/474 |

OTHER PUBLICATIONS

Yngve. Gary et al, "Animating Explosions",GVU center and College of Computing Georgia Institute of Technology,p. 29-36, SIGGRAPH 2000.*

Stettner. Adam et al, "Computer Graphics Visualization For Acoustic Simulation", Program of Computer Graphics Cornell University, p. 195-206, SIGGRAPH 0989.*

(Continued)

*Primary Examiner*—Jeffery A Brier
(74) *Attorney, Agent, or Firm*—Ogilvy Renault, LLP

(57) ABSTRACT

A software library using a 3D graphics engine to produce a real time 3D particle explosion effect is provided. The particle explosion effect creation tool allows users to create their own particle explosion effect by defining their own shapes in a graphics image data file and allows to graphically define a plurality of explosion parameters of the video particle explosion effect in the graphics image data file. Particles are driven by a particle system algorithm that is controlled by real-world attributes such as gravity, direction and dispersion. These attributes can be keyframed by the users within a video editing application to produce specific 3D Particle explosion effects such as transitions and filters on video or graphics.

14 Claims, 6 Drawing Sheets

OTHER PUBLICATIONS

Martins. Claude et al, "Visually Believable Explosions in Real Time", p. 237-247, 2001.*

Matrox G400/G450 A new dimension in speed and image quality for 3D, 2D and DVD video, available at http://www.matrox.com/mga/dev_relation/chip_tech/matrox_g400. cfm on Oct. 7, 2001 pp. 1-4.

Matrox G400 Environment Mapped Bump Mapping by Matrox on Oct. 7, 2001 pp. 2-9.

Gamasutra.com Building an Advanced Particle System, Jonh van der Burg, , Jun. 23, 2000, available at http://www.gamasutra.com/features/20000623/vanderburg_pfv.htm on Oct. 7, 2001 pp. 1-11.

Gamasutra—Features Ups and Downs of Bump Mapping with DirectX 6 published on Jun. 4, 1999 available at http://www.gamasutra.com/features/19990604/bump_01.htm on Oct. 7, 2001 17 pages.

* cited by examiner

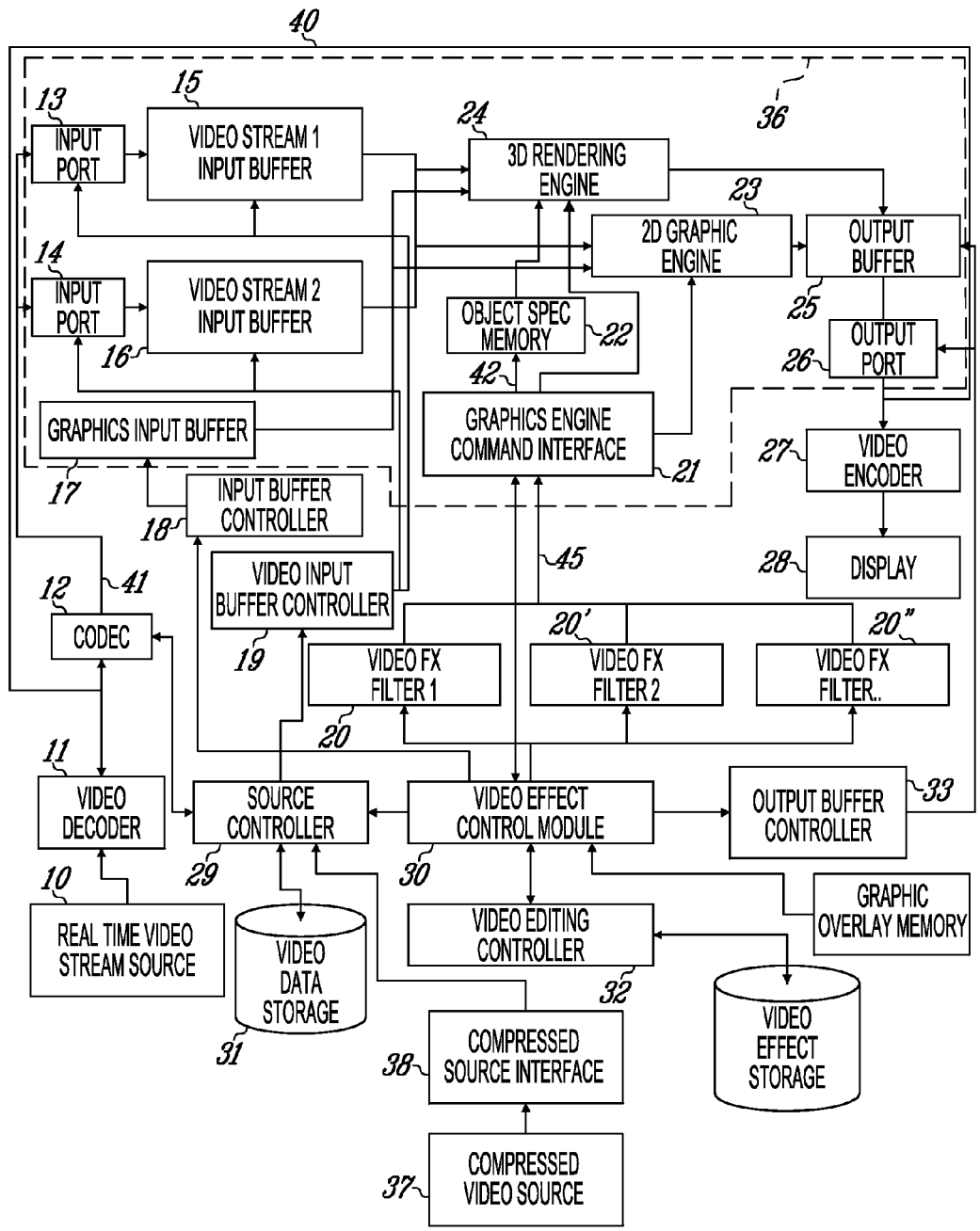
FIG_1

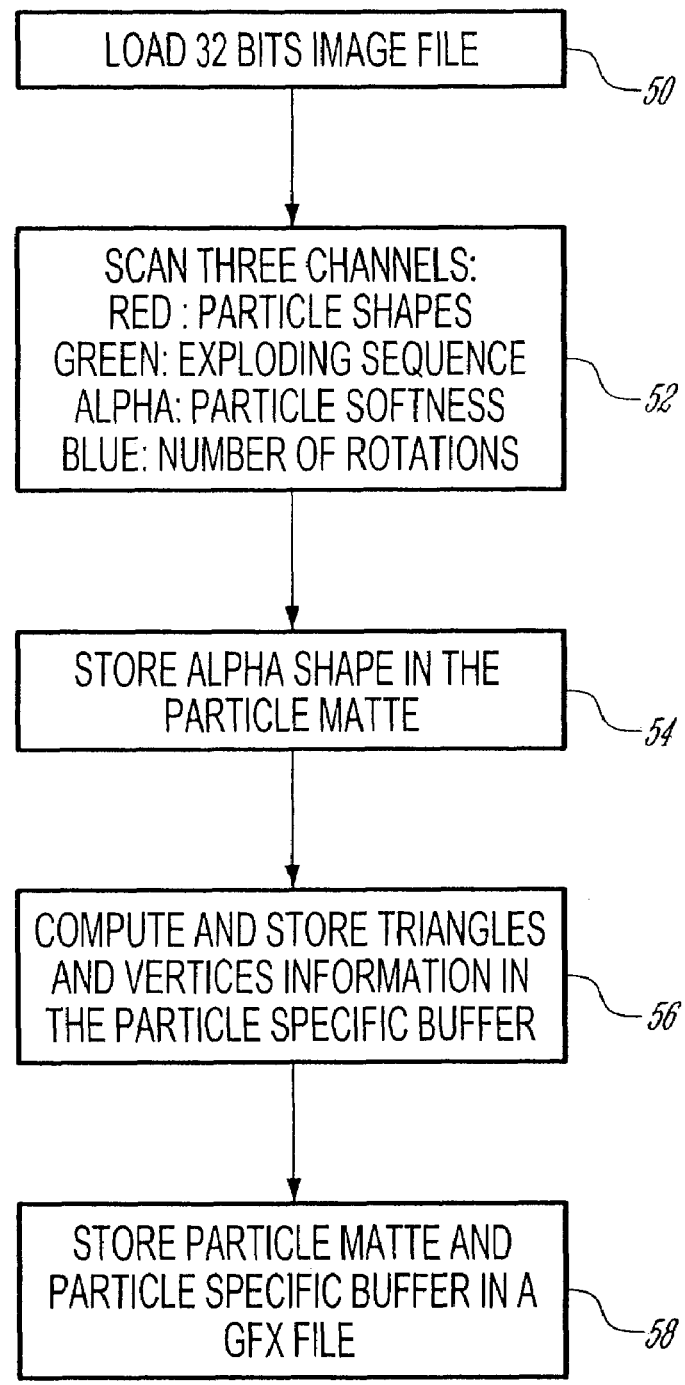
FIG_4

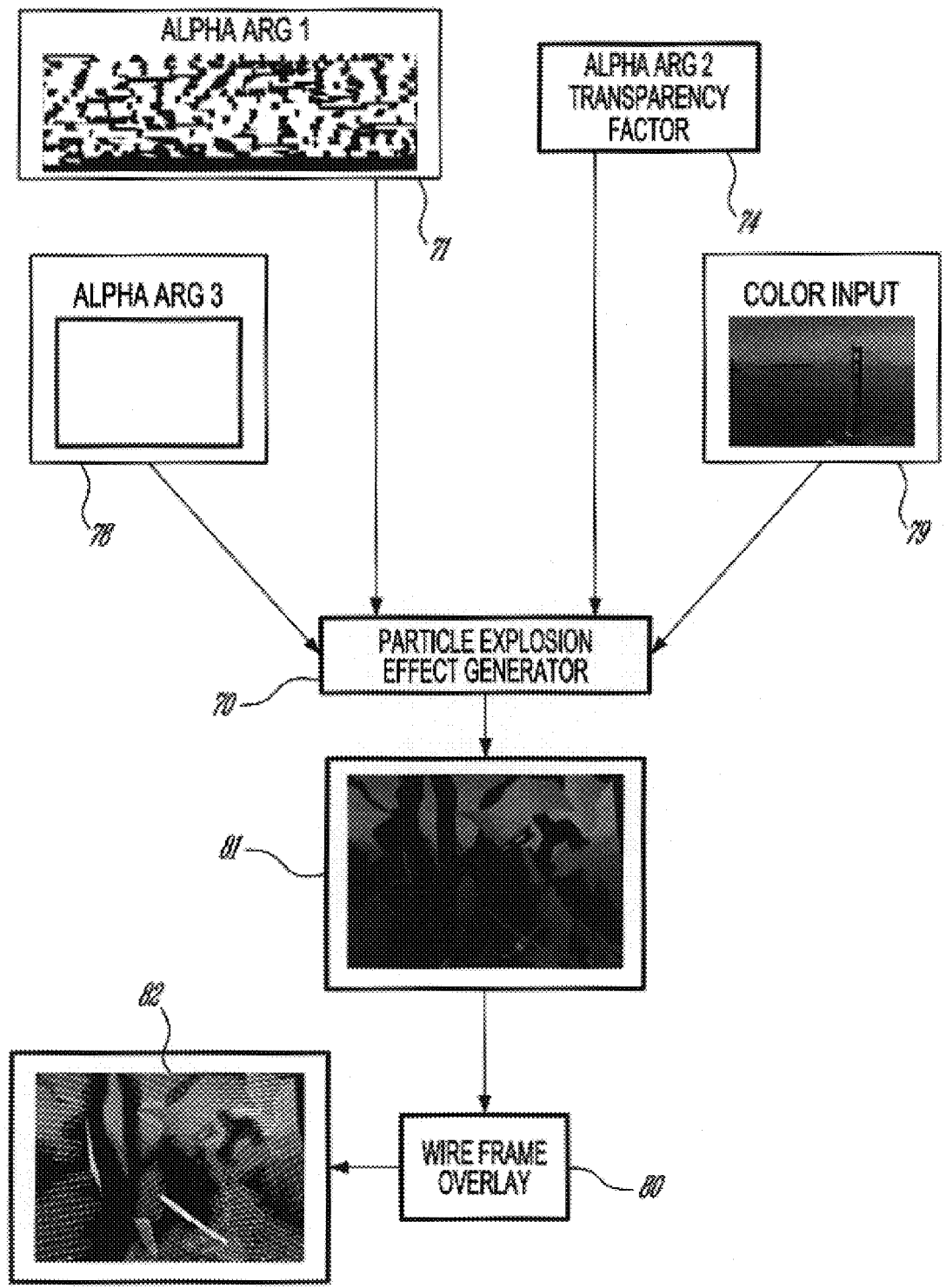

METHOD AND APPARATUS FOR GRAPHICALLY DEFINING A VIDEO PARTICLE EXPLOSION EFFECT

FIELD OF THE INVENTION

The invention relates to a real time 3D video effect. More specifically, it relates to a particle explosion effect.

BACKGROUND OF THE INVENTION

The hardware solutions currently proposed on the market for a particle explosion effect are based on dedicated chips that perform fixed functions at a fixed resolution. This approach requires that all effects be programmed in the chip which includes only a limited set of attributes that can be applied by the user. Drawbacks to such an approach include:

1) Coding and validating every transformation of the effect in the chip is a lengthy process, so typically only a small set of parameters is provided. As a result, the editor has limited creative freedom.

2) To keep the cost of DVE (Digital Video Effects) products as low as possible, manufacturers often use simplified algorithms to minimize the complexity of their chips. Quality is therefore compromised.

3) Particle shapes are simple and hard coded. Users have no possibility of defining their own shapes.

The traditional software solutions for particle explosion effects give the user many parameters to change the behavior of the particles. However, the shapes are quite simple (triangles, squares, etc.) and the user does not have the ability to modify them. Furthermore, the CPU computations required are too important to perform such effect in real time.

The current approach to using 3D graphics technology for video effects is based on rendering. A combination of an effects algorithm, CPU power, and graphics acceleration, processes the video as quickly as possible, yet this approach does not produce a real time Particle Explosion engine. The processing might be slower than real time and is therefore not reliable for streaming video at exactly 60 fields/sec (50 fields/sec in PAL).

The main problems of all the previous approaches are:

1) No possibility for the users to define their own particle shapes;

2) Lack of flexibility in the effect parameters;

3) Fully programmable effect does not run in real time.

SUMMARY OF THE INVENTION

Consequently, it is an object of the present Particle explosion effect invention to provide a real time solution of a 3D Particle Explosion Video Effect based on a flexible particle system and user-defined shapes.

The present invention provides a real time and flexible solution of a 3D Particle Explosion video effect.

The flexibility is given to the user in one or both of two ways:

1—A powerful conversion tool allows the user to develop quickly any desired particle pattern. The Particle Explosion effect can extract the particle shapes from a simple image file that can be created by the user. The shapes are first drawn, using a paint application like PhotoShop. Color-coding is used to define the border of each particle, the order in which particles will start moving and the softness applied to the particle edges. The particle explosion effect creation tool is then used to convert the image file into the native Real time video editing system file needed, called a GFX file. The GFX file contains the alpha shape of each particle as well as the complete description of the mesh (list of triangles) required for rendering each particle.

2—The particle system algorithm drives the particles path with real-world keyframable attributes such as direction, dispersion and gravity. At each field, each new particle location in the 3D space is computed accordingly to these keyframes. The triangles are then processed with two rendering stages: one for the alpha shape of the particle and one for the video (or graphic) input.

A great flexibility is also given to the effect developer. The fact that this architecture is fully programmable means that additional parameters can be added with supplementary software, enabling the possibility to improve the Particle explosion effect at a very low cost.

According to a first broad aspect of the present invention, there is provided a method for generating a plurality of object definition data sets for a video particle explosion effect. The method comprises providing a graphics image data file of a particle pattern defining a shape of a plurality of particles; generating a plurality of object definition data sets using the graphics image data file; wherein the object definition data sets can be used to render a particle explosion effect on a video file.

Preferably, the graphics image data file has a plurality of channels.

Preferably, the graphics image data file further comprises defining at least one parameter of an explosion sequence for all of the plurality of particles, a spin parameter for each of the plurality of particles and a softness of edges of each the plurality of particles and wherein the shape, the explosion sequence, the spin parameter and the a softness are each defined in one of the plurality of channels.

According to another aspect of the present invention, there is provided a method for rendering a video particle explosion effect on a video source data file comprising: providing a graphics image data file of a particle pattern defining a shape of a plurality of particles; generating a sequence of object definition data sets using the graphics image data file; providing a video source data file; rendering the video particle explosion effect using the object definition data sets and the video source data file.

Preferably, the rendering comprises loading each field of the video source data file into a graphics engine; loading a corresponding one of the sequence of object definition data sets into the graphics engine; generating a particle exploded video output using the field and the corresponding object definition data sets.

BRIEF DESCRIPTION OF THE DRAWINGS

These and other features, aspects and advantages of the present invention will become better understood with regard to the following description and accompanying drawings wherein:

FIG. 1 presents an overview of the system architecture;

FIGS. 3A, 3B and 3C are schematic representations of the particle shape extraction and triangle separation processes, wherein FIG. 3A is the extraction of one particle from the red component, 3B is the separation of the shape into small triangles and 3C is the storage of the alpha shape of each small triangle in a data file, and wherein FIGS. 3A, 3B and 3C contain photographs;

FIG. 4 shows a flow chart of the steps to convert an image file to a data file;

FIG. 5 is a schematic representation of the particle explosion effect rendering operation and contains photographs; and FIG. 5 contains photographs.

DETAILED DESCRIPTION OF THE PREFERRED EMBODIMENT

Figure 2A:
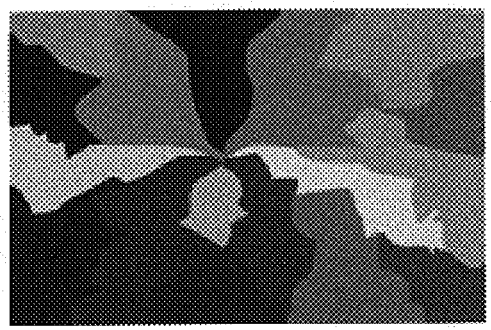
FIGS. 2A, 2B, 2C and 2D are schematic representations of an image file describing a pattern for a particle explosion effect comprising the red channel for shape description, the green channel for explosion order description, the blue channel for particle spin and the alpha channel for softness description, respectively and contain photographs.

While illustrated in the block diagrams as ensembles of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

The real time capability of this effect is made possible by a Real time video editing system architecture and described in commonly assigned co-pending U.S. patent application Ser. Nos. 09/653,701, 09/653,703 (now issued as U.S. Pat. No. 6,763,175) and U.S. patent application Ser. No. 09/653,704 (now issued as U.S. Pat. No. 6,763,176).

The Real time video editing system architecture incorporates a real time-streaming approach that ensures that video fields are always processed at a fixed rate for all effects (60 fields per second in NTSC, 50 fields per second in PAL). Broadcast quality effects are achieved using special video enabled features that are built into a general-purpose 3D accelerator chip. This computer architecture is capable of doing real time A/B roll with 3D DVE and compositing. Two or more video streams enter a Input port (time multiplexed) and an output stream outputs from an output port. The 3D graphics engine does real time 3D processing on the multiple input streams to composite an output stream in real time. In the case of the preferred embodiment, the video effect is implemented within a Video Effect Filter.

FIG. 1 is a schematic block diagram of the real time video editing system and the Real time video editing system architecture. The real time video editing system uses high performance 3D graphics chips to perform a multitude of video special effects and compositing. Within the context of the system architecture of this invention, the 2D and 3D command functions found in standard high performance graphics chips can be used for video processing. These commands can be considered as a set of basic instructions. By combining these commands with the correct parameters and in the correct sequence, virtually any visual effects can be achieved in real time.

A real time video stream source 10, such as a camera or a video tape recorder, is connected to a video decoder 11 whose uncompressed digital stream output signal is fed into a CODEC 12 on a first, dedicated, video bus 40. The CODEC 12 is capable of video stream compression and decompression in real time. The CODEC 12 can also receive compressed video stream from an external device 37 such as Fire Wire (IEEE 1394) (DV Camcorder) or SDTI. In another embodiment, the architecture comprises a codec capable of decompressing two video streams in real time. This external device 37 is connected to a compressed source interface 38 which is connected to the source controller 29. In the preferred embodiment the compressed source interface converts incoming signals from the compressed source interface 38 into DV25 or MPEG-2 format. In another embodiment, the architecture comprises a compressed source interface 38 for each available compressed video source 37. The first video bus 40 allows the decoder 11, the CODEC 12 and the video encoder 27 to communicate an uncompressed real time video stream. The CODEC 12 is connected to video bus 41 which allows the CODEC to output in real time video fields of two uncompressed video streams to the input ports 13 and 14 of the video stream input buffers 15 and 16 of the graphics accelerator chip 36. In the preferred embodiment, a single bus TDMNX (with time division multiplexing to support multiple streams of video) is used. The input ports 13 and 14, and the video stream input buffers 15 and 16 are controlled by a video input buffer controller 19. The goal of the input ports 13 and 14 is to select memory locations in each video stream input buffers 15 and 16 according to the video input buffer controller 19. These memory locations will receive the video streams. In the preferred embodiment, the graphics chip 36 is preferably a Matrox G400.

The CODEC 12 is controlled by the source controller 29. In the preferred embodiment, the CODEC 12 is a C-Cube DV25/MPEG2. The source controller 29 has access to a video data storage 31. The source controller 29 also controls the video input buffer controller 19. An input buffer controller 18 controls the graphic input buffer 17 which is connected to the 3D rendering engine. The 3D rendering engine receives data streams from the video stream input buffers 15 and 16.

Although it will be appreciated that various architectures for video editing software are possible, there is illustrated in FIG. 1 a video editing controller 32 which represents the video editing user interface and controller processing associated with the application level. The video editing controller 32 may comprise, for example, the Adobe Premiere™ software package. For each specific video effect made available according to the preferred embodiment, a video effect filter module 20 is provided. The video effect control module 30 commands the source controller 29 to retrieve specific video data files from the video data storage 31. The video effect control module 30 also commands the input buffer controller 18 and the output buffer controller 33. The output buffer controller 33 can generate an address signal which specifies a current field address. This current field address is sent to the output port 26, which will retrieve the corresponding field from the output buffer 25. The corresponding field can be then transmitted to the video encoder 27 and then to the display 28.

The video effect control module 30 provides keyframes to the desired one of the video effect filters 20, 20', 20" etc. In response, the video effect filter 20 sends commands to the graphics engine command interface 21 of the graphics chip 36 to implement the desired video processing within the graphics chip 36. The video effect control module 30 also sends commands to the graphics engine command interface 21. The keyframe data describes the functionality of the effects and the graphics engine command interface 21 interprets the keyframe data to determine what specific graphics engine command is required. In the case of a video processing task requiring the capabilities of the 3D rendering engine 24, the graphics engine command interface 21 specifies the triangle and triangle meshes on which to map a video field with a resulting 3D perspective correct or non-perspective correct effect. Such an object is stored in memory 22 by data signal 42 and defined by the parameters for the vertices of the triangle or triangle meshes on which the video is to be mapped. Using the command data signal 45, the graphics engine command interface 21 is instructed to invoke either the 3D rendering engine 24 or the 2D graphics engine 23 to execute the desired video effect function and provide a result field for output buffer 25.

In the case of the 3D rendering engine 24, the graphics engine command interface 21 provides a specific command to the 3D engine 24 to map a selected one of the fields taken from one of the buffers 15, 16 and 17, thus obtaining a transformed field.

In the case of the preferred embodiment, the video effect is implemented within the video FX filter 20. The particle effect is an effect by which a first image is exploded into particles to either transition to a second image or to solely filter the first image. Although the current invention preferably makes use of the Direct 3D technology developed by Microsoft, it will be understood by those skilled in the art that any other graphics technology could be used.

The Particle Explosion effect of the present invention is able to extract the particle shapes from a simple graphic file that can be created by the user. This graphic file describes the shape of each particle. The file could also give information about other particularities of the particle explosion effect such as explosion sequence, rotation axis, particle spin and shape softness.

An image file that defines the particle shape, explosion sequence, spin and softness could be constructed in many different ways. What follows is a description of one preferred way of combining all of the preferred information for each particle of the particle explosion effect in one image file. The effect shown as an example is a "shattered glass" pattern. As will be readily understood, any pattern can be used to create an effect. In fact, any pattern comprising distinct components can be used with the particle explosion effect. Preferably, the image file is described as follows:

Bits depth: 32 bits
Size: 720×480 (NTSC) or 720×576 (PAL)

The red channel defines the particle shape. Each particle must be drawn with a different color. Since there are 8 bits per channel, up to 256 particles (28) can be defined. Colors 251 to 254 are reserved for special particles that are called "Background particles". Special behaviors (fade, inverse direction) will be available in the keyframe for these Background particles. Color 255 is reserved for invisible particle. FIG. 2A shows an example of the red channel for a shattering glass pattern. Each portion of the shattered glass is drawn in the red channel with a different color.

Figure 2B:
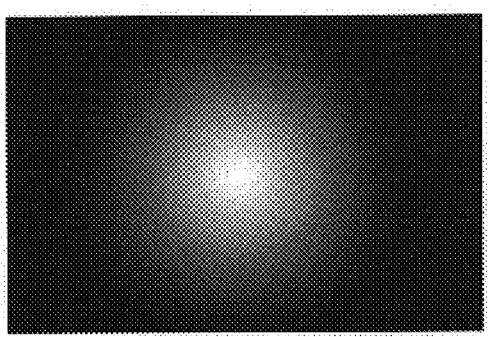

The green channel defines the explosion sequence. In this channel, each particle defined in the red channel will be associated with an explosion delay. Delay is represented by a value between 0 and 255. A zero delay will make the particle explode at the beginning of the effect progression, and a 255 delay will make it explode at the end. Intermediate values (between 0 and 255) can be used to define the desired explosion sequence. FIG. 2B shows an example of the green channel for a shattering glass pattern. In this case, the closer the average value of the particle of the shattered glass pattern to the center of the image, the faster it will explode.

Figure 2C:
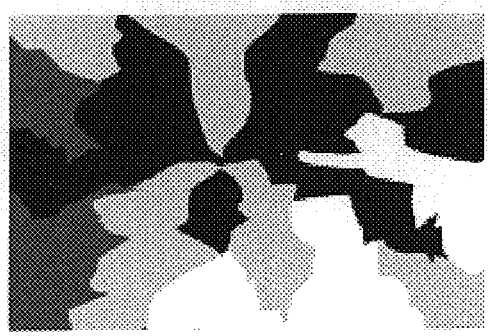

The blue channel defines the spin. In this channel, a number of rotations done by each particle is represented by a color between 0 and 255. A particle with color 0 will not spin at all and a particle with color 255 will have the maximum spin (for example: 100 rotations). Intermediate values (between 0 and 255) can be used to define the desired spin. FIG. 2C shows an example of the blue channel for a shattering glass pattern. Each portion of the shattered glass pattern is given a different color to represent spin.

Figure 2D:
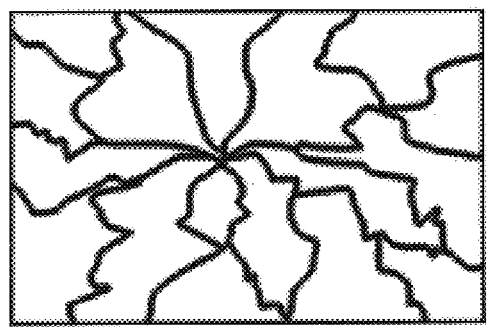

The alpha channel defines the alpha mask for each particle described in the red channel. This alpha mask is usually used to apply a softness band at the edges of each particle. The alpha range is from 0 to 255. The zero value corresponds to fully invisible and the 255 value corresponds to fully opaque. Usually, a 10 pixels softness width is enough to perform a good anti-aliasing. The softness is made with an alpha gradient from invisible to opaque. This gradient will soften the video source edge with the underneath layer. FIG. 2D shows an example of the alpha channel for a shattering glass pattern. Each particle is given an approximate 10 pixel softness band at its edges to ensure that the edges will be soft at explosion. If no softness is given to the edge of the particles, staircase edges will appear on the edges of each particle and will affect the quality of the effect.

It will be understood that parameters for the particles could be combined onto one channel. For example, a circle of a small diameter of a color different than the particle on which it is located could indicate an explosion sequence. The video effect controller would then have to recognize that circles of a particular diameter are not particles but rather define the explosion sequence of the particle on which they are located. Although this method less preferred, it would be useful in situations where less than 4 channels are available.

The conversion or preparation process step is done offline, within the particle explosion effect creation tool. This application can load the image file as described previously and process it with the Convert interface of the Particle explosion effect library.

Figure 3A:
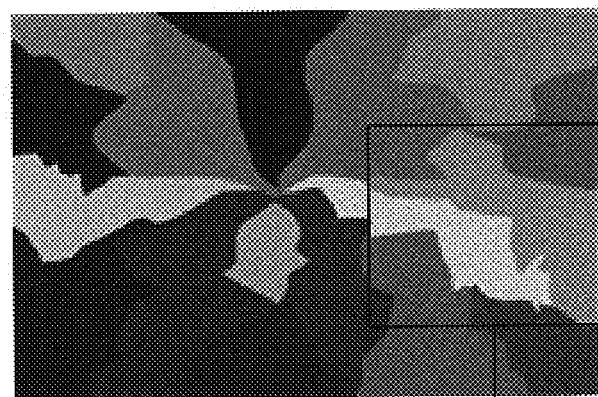
Figure 3B:
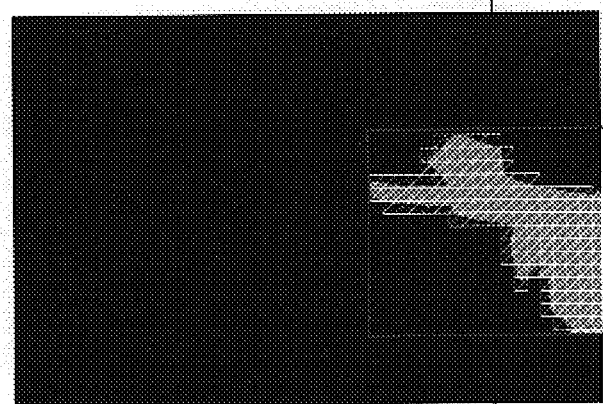
Figure 3C:
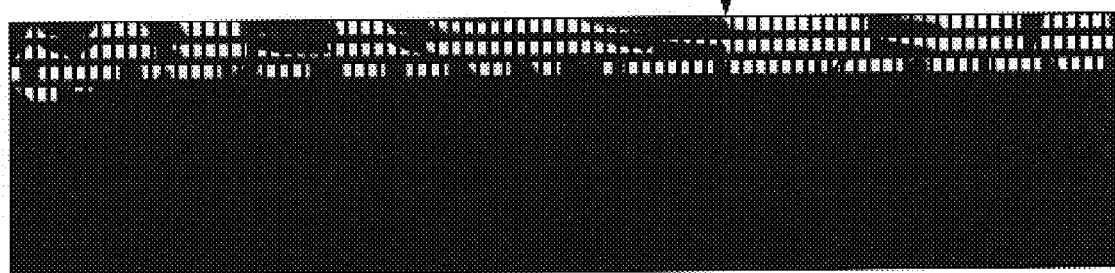

The Convert interface retrieves the relevant information from the image file and prepares two groups of data:

1. A surface (2048×1024) called "Particle Matte" containing the alpha shape of all particles divided into small sections of 16×16 pixels and isolated from each other. Two triangles are defined in each 16×16 section. The smaller the triangles are the less unused pixels required for the processing of the image. Two copies of each section are written in the Particle Matte: a copy opaque of the shape extracted from the red channel and a copy with the softness from the alpha channel. FIG. 3A shows the first step of this conversion process. A particle is first extracted from the red component. An area encompassing all of its edges is delimited around the particle. FIG. 3B shows the separation of the shape into small triangles. Finally, FIG. 3C shows the storage of the alpha shape of each small triangle in the particle matte.

2. A particle description buffer containing the number of particles and useful information about each particle such as initial position, vertices, triangle faces, explosion delay extracted from the green channel, texture coordinates, etc. For each vertex (a triangle has 3 vertices) computed, three texture coordinate sets are stored: one set will be used to retrieve the particle opaque shape, another will be used to retrieve the particle shape with softness and the third one will be used to retrieve the video source texture.

These two groups of data are then stored by the application in a custom file format called GFX (Graphic effect). This file can be loaded by the Particle explosion effect Plugin within a video editing application (such as Adobe Premiere). The Plugin can then extract the Particle Matte (surface containing the particle shapes) as well as the particle description buffer and pass them to the Particle explosion effect Library at rendering time.

FIG. 4 is a flow chart which summarizes actions performed during the preparation step described previously. The 32 bit image file is first loaded 50. The three channels are scanned 52, for example, the red for the particle shapes, the green for the exploding sequence, the blue for the number of rotations and the alpha for the particle softness. The alpha shape is then stored in the Particle Matte 54. The triangles are computed and stored. The vertices information is also stored in the particle description buffer 56. The Particle Matte and the ParticleSpecificBuffer are stored in a GFX file 58.

At rendering time, several ways can be thought of to control particles trajectory. For example, a particle system algorithm can be used to give real world properties to each particle. A particle system is a collection of particles, in which the dynamic behavior of the particles can be determined by the solution of sets of physical equations.

In such physical equations, we can take into account real world attributes such as position, speed and gravity. Further attributes can be used such as direction, dispersion, progression, spread, softness, etc. The position and the orientation of each vertex constituting the particles are computed at each field by the particle system algorithm depending on the effect progression and the keyframes provided by the user. As illustrated in FIG. 1, the user chooses, using the video editing controller 32, the parameters that are going to be used for the effect. The particles can be made to vanish as they explode, the background particles can fade or go forward as the others are sent backwards, etc.

Before rendering the field result to the output surface, the video source, which has been selected by the user in the video effect control module 30, is transferred to a temporary surface with a blit command. The graphics chip or engine 36 performs this blit command and all subsequent 2D and 3D operations. A border softness is then applied around the temporary surface in order to smooth the edges. Then, the particles can be rendered to the output surface.

Each particle effect field requires a rendering stage which is applied to all of the small triangles (16×16 pixels) of each particle effect field, as illustrated in FIG. 5. The particle explosion effect generator 70 receives the image files as inputs, processes the inputs and outputs the field of the effect applied on the video source file.

The particle explosion effect generator 70 receives the Alpha Argument 1 71, which is the GFX surface containing all of the alpha shapes of all the triangles constituting the particle shapes. The Alpha Argument 2 74, also inputted to the effect generator 70, is the transparency factor. The Alpha Argument 3 78 is, for example, the alpha channel of the source image (or video) with border softness. Finally, the Color Input 79 is the image to which the particle explosion effect is to be applied.

Several choices of rendering states can be used to perform the effect. For example, anisotropic or tri-linear filtering can be used to improve the effect quality. Also, usage of a Z-Buffer could make sure that farther particles do not overwrite nearer particles.

The processing done by the particle explosion effect generator can be summarized with the following mathematical formulas which have been found to be the most efficient processing steps for the current invention:

$$Alpha_{source} = (Alpha_{Input\ 1} * Alpha_{Input\ 2} * Alpha_{Input\ 3})$$

$$Alpha_{output}(Alpha_{source} * SourceFactor) + (Alpha_{destination} * Destination\ Factor)$$

$$Color_{source} = Color_{Input}$$

$$Color_{output} = (Color_{source} * SourceFactor) + (Color_{destination} * DestinationFactor)$$

$$SourceFactor = Alpha2Source$$

$$DestinationFactor = 1 - Alpha2Source$$

The source factor and the destination factor are there to ensure that a none-opaque pixel will be blended with the destination pixel. Therefore, the background surface will be visible through the particle softness.

As will be readily understood, other formulas could be used to render the effect without departing from the present invention.

The rendered effect for a particular time $\tau$ is shown in 81. Using a wire frame overlay functionality 80, it is possible to see the triangles which were used to render the effect as shown in 82.

From this process is outputted a sequence of object definition data sets and the object definition data sets each correspond to a particle explosion effect on a video source file at a particular moment or time. The object definition data sets are associated with a particular field of the video source file by the graphics chip or engine 36 to render the particle exploded video output.

At the end of the rendering, a feedback command can be sent by the graphics chip or engine 36 to the video effect control module 30. The feedback command indicates that the chip or engine 36 has completed the 2D and 3D operations.

Figure 6:
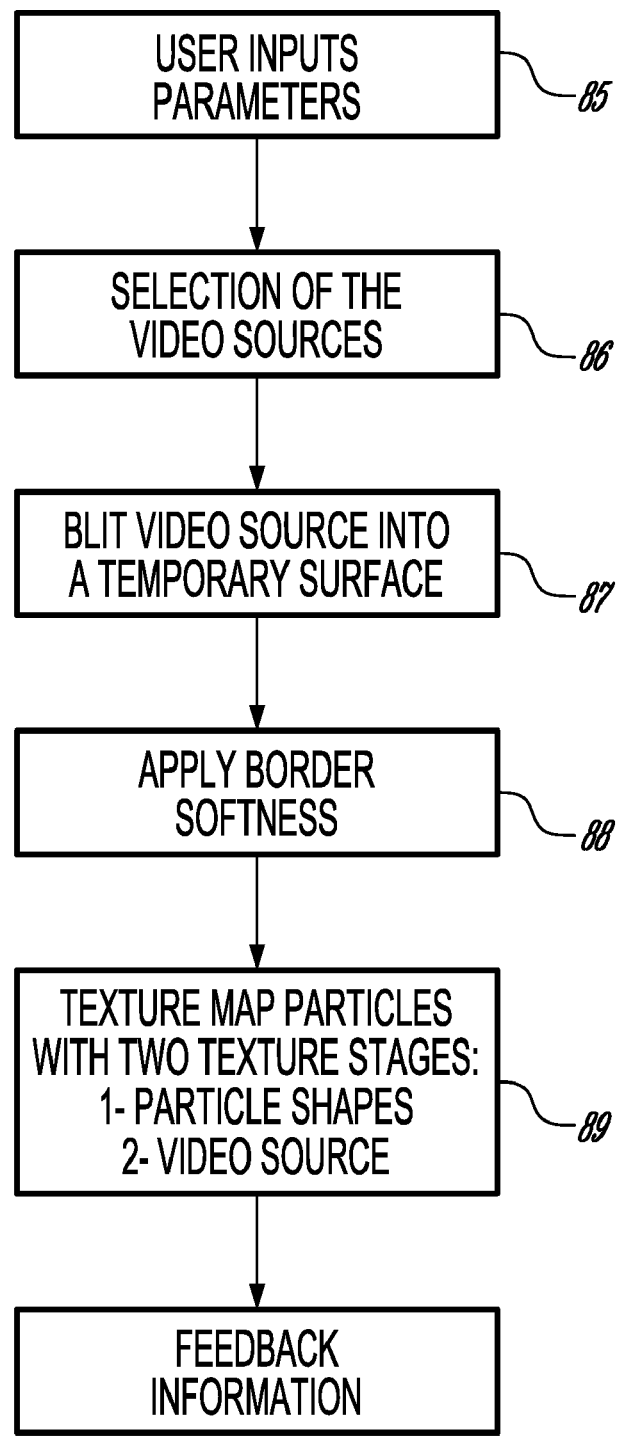
FIG. 6 shows a flow chart of the steps to realize a particle explosion effect.

FIG. 6 is a flow chart of the rendering operations described previously. The user first enters parameters 85. The selection of the video sources is then made 86. The video source is blit into a temporary surface 87. The border softness is applied to the video source 88. The particles are texture mapped with two texture stages, the particle shapes and the video source 89. Finally, the information that the graphics engine has completed the 2D and 3D operations is sent to the video effect control module 30.

The combination of the host CPU usage for the particle position computations and the graphic chip usage for the 3D rendering make the Particle explosion effect able to perform in real time. Hence, no pre-rendering is required.

It should be noted that the present invention can be carried out as a method, can be embodied in a system, a computer readable medium or an electrical or electro-magnetical signal.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features hereinbefore set forth, and as follows in the scope of the appended claims.

What is claimed is:

1. A method for rendering a video particle explosion effect on a video source data file comprising:

providing a graphics image data file of a particle pattern on which is graphically defined a plurality of explosion parameters of said video particle explosion effect, one of said explosion parameters being a shape of each of a plurality of particles;

generating a sequence of object definition data sets using said graphics image data file;
providing a video source data file;
rendering said video particle explosion effect using said object definition data sets and said video source data file as a rendered video particle explosion effect output.

2. A method as claimed in claim 1, wherein said rendering comprises
loading each field of said video source data file into a graphics engine;
loading a corresponding one of said sequence of object definition data sets into said graphics engine;
generating a particle exploded video output using said field and said corresponding object definition data sets.

3. A method for generating a sequence of object definition data sets for a video particle explosion effect comprising:
providing a graphics image data file of a particle pattern on which is graphically defined a plurality of explosion parameters of said video particle explosion effect, one of said explosion parameters being a shape of each of a plurality of particles;
generating a sequence of object definition data sets using said graphics image data file; and
storing said sequence of object definition data sets in a data set store;
wherein said object definition data sets are used with a video source file to render a particle explosion effect on said video source file.

4. A method as claimed in claim 3, wherein other ones of said explosion parameters being one of a sequence parameter of an explosion sequence for all of said plurality of particles, a spin parameter for each of said plurality of particles and a softness of edges of each said plurality of particles.

5. A method as claimed in claim 3, wherein said graphics image data file has a plurality of channels.

6. A method as claimed in claim 5, wherein each channel of said plurality of channels defines one corresponding parameter of the plurality of explosion parameters and the plurality of channels define a corresponding plurality of explosion parameters.

7. A method as claimed in claim 5, wherein said plurality of channels are a red channel, a green channel, a blue channel and an alpha channel.

8. A method as claimed in claim 4, wherein said graphics image data file has four channels and said shape, said explosion sequence, said spin parameter and said softness are each defined in one of said four channels.

9. A method as claimed in claim 3, wherein said particle pattern is a shattered glass pattern.

10. A method as claimed in claim 3, further comprising a step of drawing said graphics image data file.

11. A method as claimed in claim 10, wherein said step of drawing comprises defining an edge for said plurality of particles and filling up each of said plurality of particles with a different color.

12. A method as claimed in claim 6, further comprising a step of drawing each channel of said graphics image data file, wherein said step of drawing comprises defining an edge for said plurality of particles and filling up each of said plurality of particles with a different color and wherein each parameter is defined by said filling up in each said channel.

13. A method as claimed in claim 3, wherein said generating comprises identifying a plurality of triangles for each said particle and storing shape information from each triangle in said object definition data sets.

14. A method as claimed in claim 6, wherein said generating comprises identifying a plurality of triangles for each said particle and storing parameter information from each triangle in said object definition data sets, said parameter information being extracted from each said channel.

* * * * *